(12) United States Patent
Liu et al.

(10) Patent No.: US 12,420,758 B1
(45) Date of Patent: Sep. 23, 2025

(54) SINGLE SIDE WHEEL ANTI-LOCK BRAKING METHOD AND SYSTEM BASED ON DUAL- MICROCONTROLLER UNIT (MCU) ELECTRONIC PARKING BRAKE (EPB) SYSTEM

(71) Applicant: GLOBAL TECHNOLOGY CO., LTD, Nantong (CN)

(72) Inventors: Zhaoyong Liu, Nantong (CN); Manqi Xu, Nantong (CN); Zixiang Yu, Nantong (CN); Lili Zhang, Nantong (CN); Xibiao Liu, Nantong (CN); Xinmiao Yuan, Nantong (CN); Pengfei Yu, Nantong (CN)

(73) Assignee: GLOBAL TECHNOLOGY CO., LTD, Nantong (CN)

( * ) Notice: Subject to any disclaimer, the term of this patent is extended or adjusted under 35 U.S.C. 154(b) by 0 days.

(21) Appl. No.: 18/911,224

(22) Filed: Oct. 9, 2024

Related U.S. Application Data

(63) Continuation of application No. PCT/CN2024/113532, filed on Aug. 21, 2024.

(30) Foreign Application Priority Data

Aug. 16, 2024 (CN) .......................... 202411128235.9

(51) Int. Cl.
*B60T 8/1761* (2006.01)
*B60T 8/171* (2006.01)
*B60T 8/172* (2006.01)
*B60T 8/58* (2006.01)

(52) U.S. Cl.
CPC .......... *B60T 8/17616* (2013.01); *B60T 8/171* (2013.01); *B60T 8/172* (2013.01); *B60T 8/58* (2013.01); *B60T 2210/12* (2013.01); *B60T 2240/00* (2013.01); *B60T 2250/04* (2013.01)

(58) Field of Classification Search
CPC ...... B60T 8/17616; B60T 8/171; B60T 8/172; B60T 8/58; B60T 2210/12; B60T 2240/00; B60T 2250/04
See application file for complete search history.

(56) References Cited

FOREIGN PATENT DOCUMENTS

| CN | 102120446 A | 7/2011 |
|---|---|---|
| CN | 108501912 A | 9/2018 |
| CN | 111559362 A | 8/2020 |
| CN | 113788006 A | 12/2021 |

(Continued)

*Primary Examiner* — Andrew J Cromer
(74) *Attorney, Agent, or Firm* — Bayramoglu Law Offices LLC

(57) ABSTRACT

The provided is a single side wheel anti-lock braking method and system based on a dual-microcontroller unit (MCU) electronic parking brake (EPB) system. The method includes the following steps: S1: calculating a real-time single side slip ratio, including a real-time left side slip ratio and a real-time right side slip ratio; S2: comparing the real-time single side slip ratio with a preset locking slip ratio, and adjusting a clamping force and a clamping time step of a rear wheel; S3: comparing a number of single side release commands within a set time with a threshold, and determining a road condition; and S4: executing a braking strategy based on the road condition. With the single side wheel anti-lock braking method and system based on a dual-MCU EPB system, the provided can perform anti-lock control on single side wheels based on real-time wheel speed information and identify road conditions.

8 Claims, 2 Drawing Sheets

(56) References Cited

FOREIGN PATENT DOCUMENTS

| | | | |
|---|---|---|---|
| CN | 114407849 | A | 4/2022 |
| CN | 116653889 | A | 8/2023 |
| CN | 116946088 | A | 10/2023 |
| CN | 117985019 | A | 5/2024 |
| KR | 20030093455 | A | 12/2003 |

SINGLE SIDE WHEEL ANTI-LOCK BRAKING METHOD AND SYSTEM BASED ON DUAL- MICROCONTROLLER UNIT (MCU) ELECTRONIC PARKING BRAKE (EPB) SYSTEM

CROSS-REFERENCE TO THE RELATED APPLICATIONS

This application is a continuation application of International Application No. PCT/CN2024/113532, filed on Aug. 21, 2024, which is based upon and claims priority to Chinese Patent Application No. 202411128235.9, filed on Aug. 16, 2024, the entire contents of which are incorporated herein by reference.

TECHNICAL FIELD

The present disclosure relates to the field of vehicle braking, and in particular to a single side wheel anti-lock braking method and system based on a dual-microcontroller unit (MCU) electronic parking brake (EPB) system.

BACKGROUND

As an active safety technology, the anti-lock braking system (ABS) is mainly designed to automatically control the magnitude of braking force during emergency braking of the vehicle, in order to prevent wheel locking up and ensure rolling friction maintained between the wheels and ground. In this way, the driver can steer the vehicle even when braking with full force, thereby avoiding skidding and loss of control.

The electronic parking brake (EPB) system replaces traditional manual pull type handbrakes through electronic control, providing a more convenient and efficient parking brake solution.

EPB is mainly responsible for parking braking when the vehicle stops, while ABS plays a role during vehicle operation, especially in emergency braking situations. ABS can quickly adjust the braking force of each wheel to prevent the wheels from locking up due to excessive braking force. It ensures that the vehicle maintains maneuverability during emergency braking, avoiding slipping and losing direction control. EPB and ABS both are important components of the vehicle braking system, jointly ensuring the braking safety of the vehicle in various situations.

To further improve braking stability, EPB and ABS are combined in the prior art to form an EPB+ABS system. The EPB+ABS system can intelligently apply appropriate braking force to the wheels when activating EPB to prevent the wheels from locking up in static or low-speed situations, thereby maintaining the controllability and stability of the vehicle. However, the existing EPB+ABS system still poses a risk of the single side wheel locking up during service braking.

SUMMARY

To solve the above problems, the present disclosure provides a single side wheel anti-lock braking method and system based on a dual-microcontroller unit (MCU) electronic parking brake (EPB) system. The present disclosure can perform anti-lock control on single side wheels based on real-time wheel speed information, and identify road conditions. Thus, the present disclosure can prevent the vehicle body from deviating or rotating due to the slip of single side wheels when the two rear wheels are on a bisectional road, thereby preventing loss of control. The present disclosure further improves the stability of service braking and meets functional safety requirements.

To achieve the above objective, the present disclosure provides a single side wheel anti-lock braking method based on a dual-MCU EPB system, including the following steps:

S1: calculating, after receiving a braking request signal, a running speed of a vehicle based on real-time wheel speed information of each wheel, and determining whether the running speed of the vehicle is greater than a set speed; if so, executing a static parking command; and otherwise, executing a dynamic parking command, and calculating a real-time single side slip ratio, including a real-time left side slip ratio and a real-time right side slip ratio;

S2: comparing the real-time single side slip ratio with a preset locking slip ratio, and adjusting a clamping force and a clamping time step of a rear wheel based on a comparison result to prevent the rear wheel from locking up;

S3: comparing a number of single side release commands within a set time with a threshold, and determining a road condition based on a comparison result; and S4: executing a braking strategy based on the road condition.

Preferably, in the step S1, the set speed is 3 km/h;

the real-time left side slip ratio is calculated as follows:

$$a_L = (V_{1L} - V_{2L})/V_{1L} * 100\% \qquad (1)$$

where, $a_L$ denotes the real-time left side slip ratio of a left rear wheel relative to a left front wheel during a braking process; $V_{1L}$ denotes a real-time speed of the left front wheel of the vehicle; and $V_{2L}$ denotes a real-time speed of the left rear wheel of the vehicle; the real-time right side slip ratio is calculated as follows:

$$a_R = (V_{1R} - V_{2R})/V_{1R} * 100\% \qquad (2)$$

where, $a_R$ denotes the real-time right side slip ratio of a right rear wheel relative to a right front wheel during the braking process; $V_{1R}$ denotes a real-time speed of the right front wheel of the vehicle; and $V_{2R}$ denotes a real-time speed of the right rear wheel of the vehicle.

Preferably, the step S2 specifically includes:

S21: executing a release command if the real-time left side slip ratio is greater than the preset locking slip ratio; and otherwise, executing a clamping command; or executing a release command if the real-time right side slip ratio is greater than the preset locking slip ratio; and otherwise, executing a clamping command;

S22: returning to the step S1 to calculate the real-time single side slip ratio; and S23: returning to the step S21 based on the updated real-time single side slip ratio, and adjusting the clamping force and the clamping time step of a left EPB caliper or a right EPB caliper to prevent the left rear wheel or the right rear wheel from locking up.

Preferably, the step S23 specifically includes:

if the real-time left side slip ratio $a_L$ is greater than the preset locking slip ratio for a time of $t_{1L}$ and the clamping force is $F_{1L}$: releasing the left EPB caliper until the clamping force is 0; and if the real-time left side slip ratio $a_L$ is less than the preset locking slip ratio for a time of $t_{2L}$: continuously clamping the left EPB caliper with the clamping force of $F_{1L}$ and the clamping time step of $t_{2L} - t_{1L}$; or if the real-time right side slip ratio $a_R$ is greater than the preset locking slip ratio for a time of $t_{1R}$ and the clamping force is $F_{1R}$: releasing the right EPB caliper until the clamping force is 0; and if the real-time right side slip ratio $a_R$ is less than the preset locking slip ratio for a time of $t_{2R}$: continuously clamping the right EPB caliper with the clamping force of $F_{1R}$ and the clamping time step of $t_{2R}-t_{1R}$.

Preferably, the step S3 includes: if a number of left side release commands and a number of right side release commands are both greater than the threshold: determining that both a left side and a right side of the vehicle are on a low-adhesion road;

if the number of left side release commands and the number of right side release commands are both less than the threshold: determining that both the left side and the right side of the vehicle are on a high-adhesion road;

if the number of left side release commands is greater than the threshold and the number of right side release commands is less than the threshold: determining that the left side of the vehicle is on a low-adhesion side of a bisectional road while the right side of the vehicle is on a high-adhesion side of the bisectional road; and if the number of left side release commands is less than the threshold and the number of right side release commands is greater than the threshold: determining that the left side of the vehicle is on the high-adhesion side of the bisectional road while the right side of the vehicle is on the low-adhesion side of the bisectional road.

Preferably, the step S4 specifically includes:
inputting the road condition into a control braking model, identifying a current road condition through the control braking model, and outputting the braking strategy.

A system for the single side wheel anti-lock braking method based on a dual-MCU EPB system includes:
wheel speed sensors, configured to acquire the real-time wheel speed information of each wheel;
an EPB switch, configured to generate the braking request signal;
a first MCU, configured to determine the real-time left side slip ratio of the vehicle and the road condition based on the real-time wheel speed information of the left rear wheel and the left front wheel after receiving the braking request signal, and generate a parking command;
a second MCU, configured to determine the real-time right side slip ratio of the vehicle and the road condition based on the real-time wheel speed information of the right rear wheel and the right front wheel after receiving the braking request signal, and generate a parking command;
a left EPB caliper, configured to clamp and decelerate the left rear wheel according to the generated parking command;
a right EPB caliper, configured to clamp and decelerate the right rear wheel according to the generated parking command;
a vehicle battery power supply, configured to supply power to the above-mentioned components; and
an EPB controller, electrically connected to the first MCU, the second MCU, and the EPB switch, where the first MCU and the second MCU are electrically connected to the left EPB caliper and the right EPB caliper, respectively; and the left EPB caliper and the right EPB caliper are located on the left rear wheel and the right rear wheel, respectively; and the wheel speed sensors located on the left rear wheel and the left front wheel are both electrically connected to the first MCU via a controller area network (CAN) line; and the wheel speed sensors located on the right rear wheel and right front wheel are both electrically connected to the second MCU via a CAN line.

Preferably, the first MCU and the second MCU exchange information through a serial peripheral interface (SPI) communication protocol.

Preferably, an operating voltage of the vehicle battery power supply is 9-16 V.

The present disclosure has the following beneficial effects:

The present disclosure can perform anti-lock control on single side wheels based on real-time wheel speed information, and identify road conditions. Thus, the present disclosure can prevent the vehicle body from deviating or rotating due to the slip of single side wheels when the two rear wheels are on a bisectional road, thereby preventing loss of control. The present disclosure further improves the accuracy, stability, and functional safety of EPB control, maximizing the protection of the vehicle and passengers.

The technical solutions of the present disclosure will be further described in detail below with reference to drawings and embodiments.

DETAILED DESCRIPTION OF THE EMBODIMENTS

Figure 1:
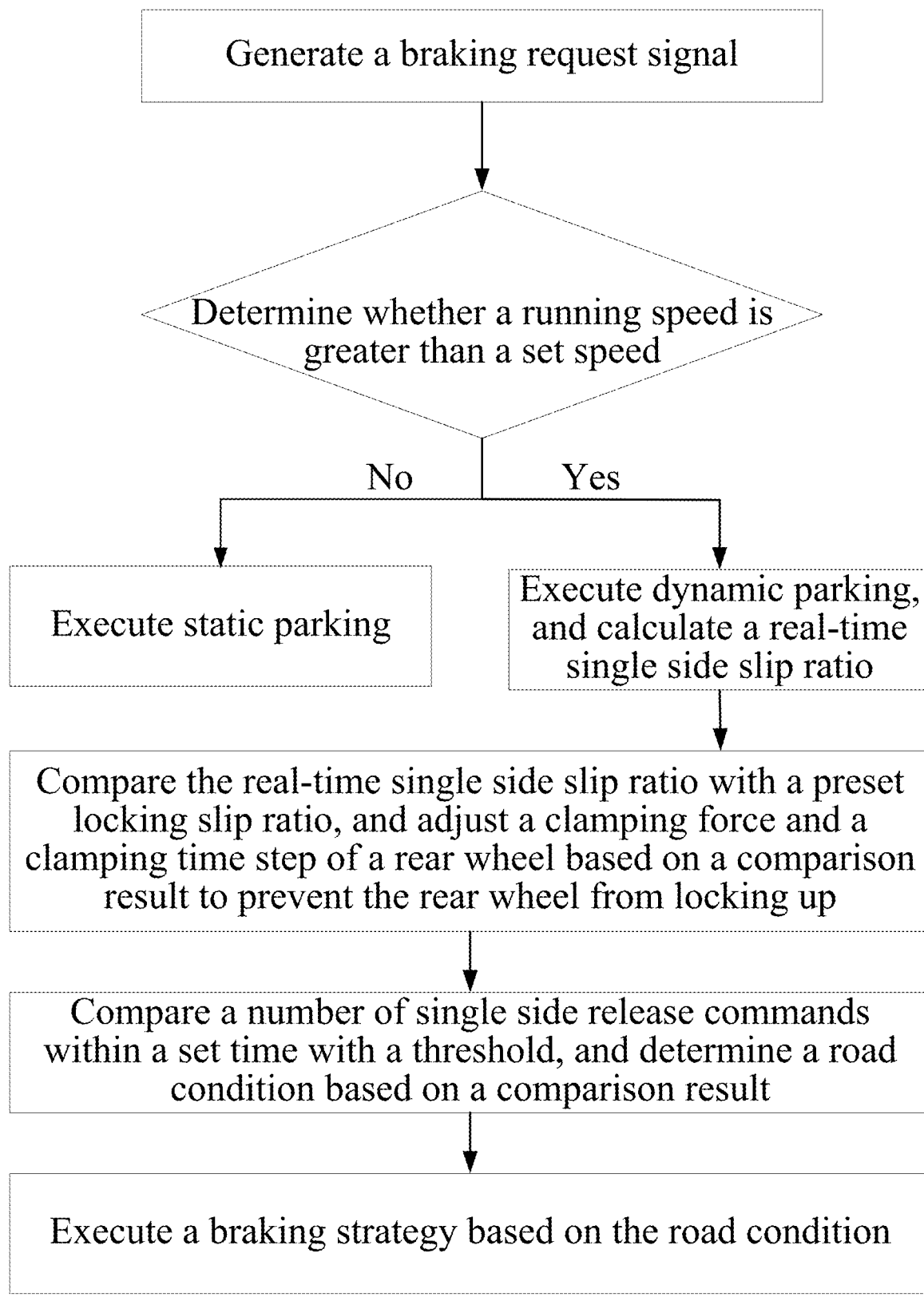
FIG. 1 is a flowchart of a single side wheel anti-lock braking method based on a dual-microcontroller unit (MCU) electronic parking brake (EPB) system according to the present disclosure.
Figure 2:
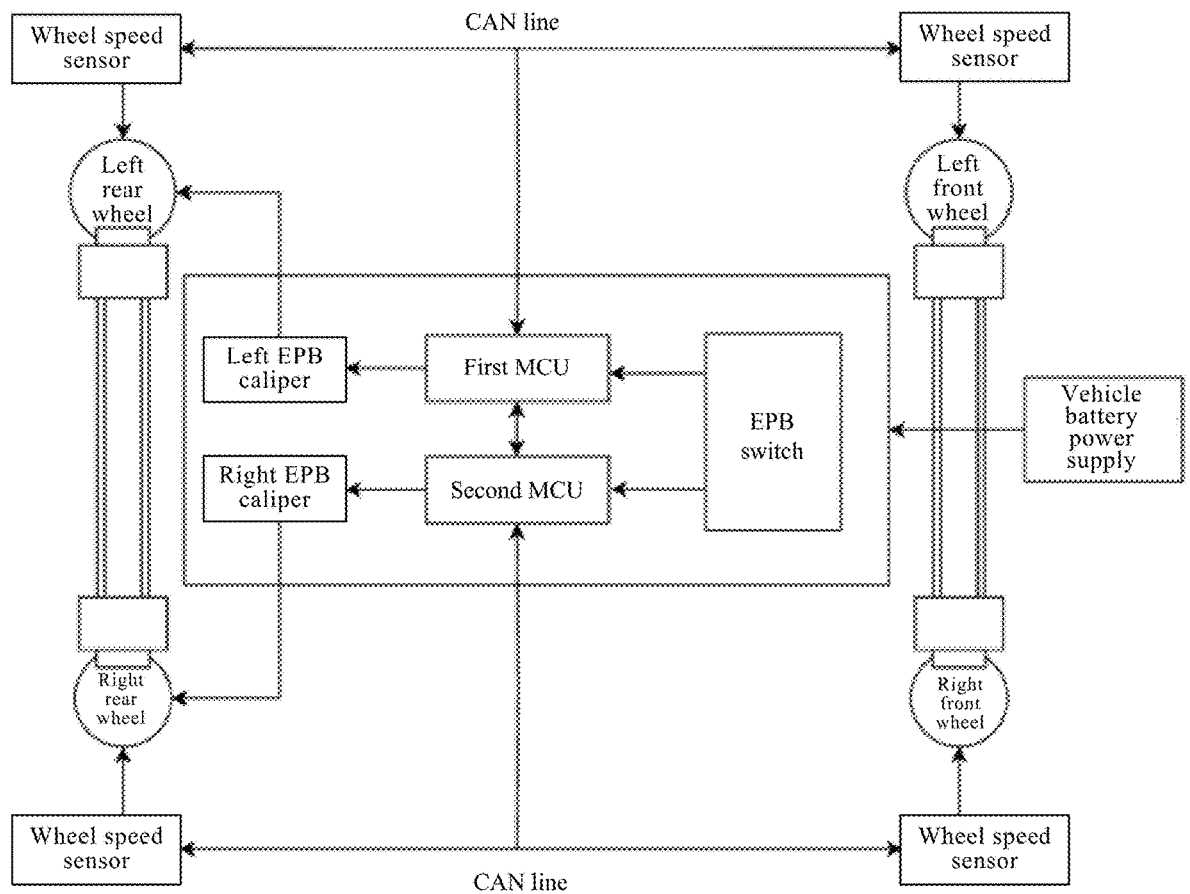
FIG. 2 is a block diagram of a system for the single side wheel anti-lock braking method based on a dual-MCU EPB system according to the present disclosure.

In order to make the objectives, technical solutions, and advantages in the embodiments of the present disclosure clearly understood, the embodiments of the present disclosure are described in more detail below with reference to the drawings and embodiments. It should be understood that the specific embodiments described herein are only intended to explain the embodiments of the present disclosure, rather than to limit the embodiments of the present disclosure. All other embodiments obtained by those of ordinary skill in the art based on the embodiments of the present disclosure without creative efforts should fall within the protection scope of the present disclosure. The examples of the embodiments are shown in the drawings. The same or similar numerals represent the same or similar elements or elements with the same or similar functions throughout the specification.

It should be noted that the terms "include", "comprise" and any of their variants are intended to cover a non-exclusive inclusion. For example, a process, method, system, product or server that includes a list of steps or units is not necessarily limited to those steps or units which are clearly listed. In stead, they may include other steps or units that are not clearly listed or are inherent to the process, method, product or device.

Similar reference numerals and letters represent similar items in the drawings below. Therefore, once an item is defined in a drawing, it does not need to be further defined and described in a subsequent drawing.

In the description of the present disclosure, it should be noted that orientation or position relationships indicated by terms such as "upper", "lower", "inner", and "outer" are those shown in the drawings or those when the product is usually placed in use. These terms are only intended to facilitate and simplify the description of the present disclosure, rather than to indicate or imply that the mentioned device or elements must have a specific orientation or must be constructed and operated in a specific orientation. Therefore, these terms should not be understood as a limitation to the present disclosure.

In the description of the present disclosure, it should be noted that unless otherwise clearly specified and defined, meanings of terms "arrange", "mount", "connected with", "connected to", and "fix" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand specific meanings of the foregoing terms in the present disclosure based on a specific situation.

In order to meet the increasing requirements for braking stability and functional safety of EPB systems, the present disclosure is designed based on a dual-MCU EPB+ABS system. A single side wheel anti-lock braking method based on a dual-MCU EPB system includes the following steps.

S1. After a braking request signal is received, a running speed of a vehicle is calculated based on real-time wheel speed information of each wheel. It is determined whether the running speed of the vehicle is greater than a set speed. If so, a static parking command is executed. Otherwise, a dynamic parking command is executed, and a real-time single side slip ratio is calculated, including a real-time left side slip ratio and a real-time right side slip ratio.

In the step S1, the set speed is 3 km/h. Based on real-time wheel speeds acquired by wheel speed sensors, it is determined whether the vehicle speed is greater than 3 km/h. If the vehicle speed is less than 3 km/h, the vehicle is determined as in a static state, and a static parking command is generated and transmitted to a left EPB caliper and a right EPB caliper. If the vehicle speed is greater than 3 km/h, the vehicle is determined as in a dynamic driving state, and a dynamic parking command is generated and transmitted to the left EPB caliper and the right EPB caliper. Then the single side slip ratio is calculated.

The real-time left side slip ratio is calculated as follows:

$$a_L = (V_{1L} - V_{2L})/V_{1L} * 100\% \quad (1)$$

where, $a_L$ denotes the real-time left side slip ratio of a left rear wheel relative to a left front wheel during a braking process; $V_{1L}$ denotes a real-time speed of the left front wheel of the vehicle; and $V_{2L}$ denotes a real-time speed of the left rear wheel of the vehicle.

The real-time right side slip ratio is calculated as follows:

$$a_R = (V_{1R} - V_{2R})/V_{1R} * 100\% \quad (2)$$

where, $a_R$ denotes the real-time right side slip ratio of a right rear wheel relative to a right front wheel during the braking process; $V_{1R}$ denotes a real-time speed of the right front wheel of the vehicle; and $V_{2R}$ denotes a real-time speed of the right rear wheel of the vehicle.

S2. The real-time single side slip ratio is compared with a preset locking slip ratio, and a clamping force and a clamping time step of a rear wheel are adjusted based on a comparison result to prevent the rear wheel from locking up.

The step S2 is specifically implemented as follows.

S21. A release command is executed if the real-time left side slip ratio is greater than the preset locking slip ratio. Otherwise, a clamping command is executed, or A release command is executed if the real-time right side slip ratio is greater than the preset locking slip ratio. Otherwise, a clamping command is executed.

S22. The processing returns to the step S1 to calculate the real-time single side slip ratio.

S23. The processing returns to the step S21 based on the updated real-time single side slip ratio, and the clamping force and the clamping time step of a left EPB caliper or a right EPB caliper are adjusted to prevent the left rear wheel or the right rear wheel from locking up. The step S23 is specifically implemented as follows.

If the real-time left side slip ratio $a_L$ is greater than the preset locking slip ratio for a time of $t_{1L}$ and the clamping force is $F_{1L}$, the left EPB caliper is released until the clamping force is 0. If the real-time left side slip ratio, is less than the preset locking slip ratio for a time of $t_{2L}$, the left EPB caliper is continuously clamped with the clamping force of $F_{1L}$ and the clamping time step of $t_{2L} - t_{1L}$. Therefore, the clamping and releasing operations are alternately carried out according to a time interval of $t_{2L} - t_{1L}$.

If the real-time right side slip ratio OR is greater than the preset locking slip ratio for a time of $t_{1R}$ and the clamping force is $F_{1R}$, the right EPB caliper is released until the clamping force is 0. If the real-time right side slip ratio $a_R$ is less than the preset locking slip ratio for a time of $t_{2R}$, the right EPB caliper is continuously clamped with the clamping force of $F_{1R}$ and the clamping time step of $t_{2R} - t_{1R}$. Therefore, the clamping and releasing operations are alternately carried out according to a time interval of $t_{2R} - t_{1R}$. This step continuously adjusts the clamping force and clamping time step on the corresponding side based on the calculated real-time single side slip ratio, in order to prevent the single side wheels from locking up and improve control stability.

S3. A number of single side release commands within a set time is compared with a threshold, and a road condition is determined based on a comparison result.

The step S3 is implemented as follows. If a number of left side release commands and a number of right side release commands are both greater than the threshold, it is determined that both a left side and a right side of the vehicle are on a low-adhesion road.

If the number of left side release commands and the number of right side release commands are both less than the threshold, it is determined that both the left side and the right side of the vehicle are on a high-adhesion road.

If the number of left side release commands is greater than the threshold and the number of right side release commands is less than the threshold, it is determined that the left side of the vehicle is on a low-adhesion side of a bisectional road while the right side of the vehicle is on a high-adhesion side of the bisectional road.

If the number of left side release commands is less than the threshold and the number of right side release commands is greater than the threshold, it is determined that the left side of the vehicle is on the high-adhesion side of the bisectional road while the right side of the vehicle is on the low-adhesion side of the bisectional road.

S4. A braking strategy is executed based on the road condition.

The step S4 is specifically implemented as follows.

The road condition is input into a control braking model, a current road condition is identified through the control braking model, and the braking strategy is output.

In this embodiment, the braking model includes preset parameters based on road conditions, that is, clamping forces and clamping time steps. The clamping forces are preset values estimated by the caliper supplier based on the vehicle weight and brake performance parameters, which are $F_{1L}$ and $F_{1R}$ in the step S23. The clamping time steps are preset values generated by an automated machine learning algorithm, including the time, frequency, and interval time of clamping operations with the clamping force of $F_{1L}$ or $F_{1R}$, aiming to maintain stability while ensuring that the deceleration meets the requirements. Due to the different braking parameters (clamping force and clamping time step parameters) set under different road conditions, after identifying the specific working conditions in the step S3, the braking model switches to the corresponding braking parameters for braking control and monitors the real-time slip ratio. It works in conjunction with the ABS algorithm to prevent rear wheels from locking up.

A system for the single side wheel anti-lock braking method based on a dual-MCU EPB system includes: wheel speed sensors, configured to acquire the real-time wheel speed information of each wheel; an EPB switch, configured to generate the braking request signal; a first MCU, configured to determine the real-time left side slip ratio of the vehicle and the road condition based on the real-time wheel speed information of the left rear wheel and the left front wheel after receiving the braking request signal, and generate a parking command; a second MCU, configured to determine the real-time right side slip ratio of the vehicle and the road condition based on the real-time wheel speed information of the right rear wheel and the right front wheel after receiving the braking request signal, and generate a parking command; a left EPB caliper, configured to clamp and decelerate the left rear wheel according to the generated parking command; a right EPB caliper, configured to clamp and decelerate the right rear wheel according to the generated parking command; a vehicle battery power supply, configured to supply power to the above-mentioned components; and an EPB controller, electrically connected to the first MCU, the second MCU, and the EPB switch. The first MCU and the second MCU are electrically connected to the left EPB caliper and the right EPB caliper, respectively. The left EPB caliper and the right EPB caliper are located on the left rear wheel and the right rear wheel, respectively. The wheel speed sensors located on the left rear wheel and the left front wheel are both electrically connected to the first MCU via a controller area network (CAN) line. The wheel speed sensors located on the right rear wheel and right front wheel are both electrically connected to the second MCU via a CAN line.

The first MCU and the second MCU exchange information through a serial peripheral interface (SPI) communication protocol. An operating voltage of the vehicle battery power supply is 9-16 V.

Through the above structure, the present disclosure calculates the real-time slip ratio based on the real-time wheel speeds during dynamic braking or emergency braking of the vehicle, in order to control the clamping forces and clamping time steps of single side wheels respectively, and thus achieve anti-lock control on single side wheels. The present disclosure can accurately identify road conditions based on the adjustment strategy. Thus, the present disclosure can prevent the vehicle body from deviating or rotating due to the slip of single side wheels when the two rear wheels are on a bisectional road, thereby preventing loss of control. Therefore, the present disclosure further improves the stability of service braking and meets functional safety requirements to protect the vehicle and passengers.

It should be noted that the above electronic components are all mature products on the market. This embodiment only requires the purchase and connection of the above-mentioned electronic components according to the instructions, without the need for improvement. Therefore, the circuit connection structures and principles of these electronic components will not be elaborated herein.

Therefore, the present disclosure provides the single side wheel anti-lock braking method and system based on a dual-MCU EPB system. The present disclosure can adjust the single side clamping forces and clamping time steps according to the real-time states of the four wheels, and accurately identify the road conditions. Especially in complex braking conditions, for example, on bisectional roads, the present disclosure features flexible control, accurate identification, and high functional safety level. The present disclosure can avoid the safety hazard of single side rear wheel locking caused by the difference in working conditions between the left and right sides during the service braking process, further meeting the stability and functional safety requirements of service braking.

Finally, it should be noted that the foregoing embodiments are only intended to describe, rather than to limit the technical solutions of the present disclosure. Although the present disclosure is described in detail with reference to the preferred embodiments, a person of ordinary skill in the art should understand that modifications or equivalent replacements may be made to the technical solutions of the present disclosure without departing from the spirit and scope of the technical solutions of the present disclosure.

What is claimed is:

1. A single side wheel anti-lock braking method based on a dual-microcontroller unit (MCU) electronic parking brake (EPB) system, comprising the following steps:

S1: calculating, after receiving a braking request signal, a running speed of a vehicle based on real-time wheel speed information of each wheel, and determining whether the running speed of the vehicle is less than a set speed; when the running speed of the vehicle is less than the set speed, executing a static parking command; and when the running speed of the vehicle is greater than or equal to the set speed, executing a dynamic parking command, and calculating a real-time single side slip ratio, comprising a real-time left side slip ratio and a real-time right side slip ratio;

wherein in the step S1, the set speed is 3 km/h;

the real-time left side slip ratio is calculated as follows:

$$a_L=(V_{1L}-V_{2L})/V_{1L}*100\% \quad (1)$$

wherein $a_L$ denotes the real-time left side slip ratio of a left rear wheel relative to a left front wheel during a braking process; $V_{1L}$ denotes a real-time speed of the left front wheel of the vehicle; and $V_{2L}$ denotes a real-time speed of the left rear wheel of the vehicle;

the real-time right side slip ratio is calculated as follows:

$$a_R=(V_{1R}-V_{2R})/V_{1R}*100\% \quad (2)$$

wherein $a_R$ denotes the real-time right side slip ratio of a right rear wheel relative to a right front wheel during the braking process; $V_{1R}$ denotes a real-time speed of the right front wheel of the vehicle; and $V_{2R}$ denotes a real-time speed of the right rear wheel of the vehicle;

S2: comparing the real-time single side slip ratio with a preset locking slip ratio, and adjusting a clamping force and a clamping time step of a rear wheel based on a comparison result to prevent the rear wheel from locking up;

wherein the step S2 comprises:

S21: executing a release command when the real-time left side slip ratio is greater than the preset locking slip ratio; and when the real-time left side slip ratio is less than or equal to the preset locking slip ratio, executing a clamping command; or executing a release command when the real-time right side slip ratio is greater than the preset locking slip ratio; and when the real-time right side slip ratio is less than or equal to the preset locking slip ratio, executing a clamping command;

S22: returning to the step S1 to calculate the real-time single side slip ratio; and S23: returning to the step S21 based on the updated real-time single side slip ratio, and adjusting the clamping force and the clamping time step of a left EPB caliper or a right EPB caliper to prevent the left rear wheel or the right rear wheel from locking up;

wherein the step S23 comprises:

when the real-time left side slip ratio $\alpha_L$ is greater than the preset locking slip ratio for a time of $t_{1L}$ and the clamping force is $F_{1L}$: releasing the left EPB caliper until the clamping force is 0; and when the real-time left side slip ratio $\alpha_L$ is less than the preset locking slip ratio for a time of $t_{2L}$: continuously clamping the left EPB caliper with the clamping force of $F_{1L}$ and the clamping time step of $t_{2L}-t_{1L}$; or when the real-time right side slip ratio $\alpha_R$ is greater than the preset locking slip ratio for a time of $t_{1R}$ and the clamping force is $F_{1R}$: releasing the right EPB caliper until the clamping force is 0; and when the real-time right side slip ratio $\alpha_R$ is less than the preset locking slip ratio for a time of $t_{2R}$: continuously clamping the right EPB caliper with the clamping force of $F_{1R}$ and the clamping time step of $t_{2R}-t_{1R}$;

S3: comparing a number of single side release commands within a set time with a threshold, and determining a road condition based on a comparison result;

wherein the step S3 comprises: when a number of left side release commands and a number of right side release commands are both greater than the threshold: determining that both a left side and a right side of the vehicle are on a low-adhesion road;

when the number of left side release commands and the number of right side release commands are both less than the threshold: determining that both the left side and the right side of the vehicle are on a high-adhesion road;

when the number of left side release commands is greater than the threshold and the number of right side release commands is less than the threshold: determining that the left side of the vehicle is on a low-adhesion side of a bisectional road while the right side of the vehicle is on a high-adhesion side of the bisectional road; and when the number of left side release commands is less than the threshold and the number of right side release commands is greater than the threshold: determining that the left side of the vehicle is on a high-adhesion side of the bisectional road while the right side of the vehicle is on the low-adhesion side of the bisectional road; and S4: executing a braking strategy based on the road condition.

2. The single side wheel anti-lock braking method based on the dual-MCU EPB system according to claim 1, wherein the step S4 comprises:

inputting the road condition into a control braking model, identifying a current road condition through the control braking model, and outputting the braking strategy.

3. A system for the single side wheel anti-lock braking method based on the dual-MCU EPB system according to claim 1, comprising:

wheel speed sensors, configured to acquire the real-time wheel speed information of each wheel;

an EPB switch, configured to generate the braking request signal;

a first MCU, configured to determine the real-time left side slip ratio of the vehicle and the road condition based on the real-time wheel speed information of a left rear wheel and a left front wheel after receiving the braking request signal, and generate a first parking command;

a second MCU, configured to determine the real-time right side slip ratio of the vehicle and the road condition based on the real-time wheel speed information of a right rear wheel and a right front wheel after receiving the braking request signal, and generate a second parking command;

a left EPB caliper, configured to clamp and decelerate the left rear wheel according to the first parking command;

a right EPB caliper, configured to clamp and decelerate the right rear wheel according to the second parking command;

a vehicle battery power supply, configured to supply power to the wheel speed sensors, the EPB switch, the first MCU, the second MCU, the left EPB caliper, and the right EPB caliper; and an EPB controller, electrically connected to the first MCU, the second MCU, and the EPB switch, wherein the first MCU and the second MCU are electrically connected to the left EPB caliper and the right EPB caliper, respectively; and the left EPB caliper and the right EPB caliper are located on the left rear wheel and the right rear wheel, respectively; and the wheel speed sensors located on the left rear wheel and the left front wheel are both electrically connected to the first MCU via a first controller area network (CAN) line; and the wheel speed sensors located on the right rear wheel and right front wheel are both electrically connected to the second MCU via a second CAN line.

4. The system for the single side wheel anti-lock braking method based on the dual-MCU EPB system according to claim 3, wherein the first MCU and the second MCU exchange information through a serial peripheral interface (SPI) communication protocol.

5. The system for the single side wheel anti-lock braking method based on the dual-MCU EPB system according to claim 4, wherein an operating voltage of the vehicle battery power supply is 9-16 V.

6. The system according to claim 3, wherein in the single side wheel anti-lock braking method, the step S4 comprises:

inputting the road condition into a control braking model, identifying a current road condition through the control braking model, and outputting the braking strategy.

7. The system for the single side wheel anti-lock braking method based on the dual-MCU EPB system according to claim 6, wherein the first MCU and the second MCU exchange information through a serial peripheral interface (SPI) communication protocol.

8. The system for the single side wheel anti-lock braking method based on the dual-MCU EPB system according to claim 7, wherein an operating voltage of the vehicle battery power supply is 9-16 V.

* * * * *